United States Patent
Xia et al.

(10) Patent No.: US 10,749,636 B2
(45) Date of Patent: Aug. 18, 2020

(54) HARQ SENDING AND RECEIVING METHODS AND DEVICES, AND NODE

(71) Applicant: ZTE Corporation, Shenzhen (CN)

(72) Inventors: Shuqiang Xia, Shenzhen (CN); Bo Dai, Shenzhen (CN); Zhisong Zuo, Shenzhen (CN); Chunli Liang, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 30 days.

(21) Appl. No.: 15/573,864

(22) PCT Filed: Apr. 20, 2016

(86) PCT No.: PCT/CN2016/079789
§ 371 (c)(1),
(2) Date: Nov. 14, 2017

(87) PCT Pub. No.: WO2016/184289
PCT Pub. Date: Nov. 24, 2016

(65) Prior Publication Data
US 2018/0287741 A1    Oct. 4, 2018

(30) Foreign Application Priority Data

May 15, 2015  (CN) .......................... 2015 1 0251369

(51) Int. Cl.
*H04L 1/18* (2006.01)
*H04L 1/16* (2006.01)

(52) U.S. Cl.
CPC .......... *H04L 1/1812* (2013.01); *H04L 1/1614* (2013.01); *H04L 1/1635* (2013.01);
(Continued)

(58) Field of Classification Search
CPC ....... H04L 1/1812; H04L 1/18; H04L 1/1614; H04L 1/1635; H04L 1/1825;
(Continued)

(56) References Cited

U.S. PATENT DOCUMENTS 6,658,619 B1    12/2003 Chen
8,705,413 B2 *  4/2014  Li ......................... H04L 1/1614
                                                                370/280
(Continued)

FOREIGN PATENT DOCUMENTS

CN       101594211 A    12/2009
CN       101795170 A    8/2010
(Continued)

OTHER PUBLICATIONS

International Search Report in international application No. PCT/CN2016/079789, dated Jul. 8, 2016, 2 pgs.
(Continued)

*Primary Examiner* — Paul H Masur
*Assistant Examiner* — Michael K Phillips
(74) *Attorney, Agent, or Firm* — Li & Cai Intellectual Property (USA) Office

(57) ABSTRACT

Disclosed are an HARQ sending and receiving method and device, and a node. The method comprises: detecting reception conditions of N transmission blocks; according to the reception conditions, generating a first HARQ status value with the length of M bits, wherein each value of all the first HARQ status values corresponds to one reception condition of the N transmission blocks when k falls within a pre-set value range on a one-to-one basis, where k is the number of correctly received transmission blocks among the received transmission blocks, M, N and k are integers, N≤M<N, and 0≤k≤N; and sending the first HARQ status value as HARQ information.

15 Claims, 4 Drawing Sheets

(52) U.S. Cl.
CPC .............. *H04L 1/18* (2013.01); *H04L 1/1825* (2013.01); *H04L 1/1864* (2013.01); *H04L 1/1621* (2013.01)

(58) Field of Classification Search
CPC ... H04L 5/0055; H04L 1/1861; H04L 1/0073; H04L 1/1864; H04L 1/1621; H04W 72/0413; H04W 72/042; H04W 452/20; H04W 72/0406
See application file for complete search history.

(56) References Cited

U.S. PATENT DOCUMENTS

| | | | |
|---|---|---|---|
| 8,780,870 B2 | 7/2014 | Papasakellariou et al. | |
| 8,908,574 B2 | 12/2014 | Papasakellariou et al. | |
| 9,019,872 B2 | 4/2015 | Papasakellariou et al. | |
| 2006/0048034 A1 | 3/2006 | Cho | |
| 2011/0219281 A1* | 9/2011 | Wang | G08C 25/02 714/749 |
| 2012/0106407 A1 | 5/2012 | Papasakellariou | |
| 2012/0106408 A1 | 5/2012 | Papasakellariou | |
| 2013/0315180 A1 | 11/2013 | Papasakellariou et al. | |
| 2014/0286208 A1 | 9/2014 | Papasakellariou et al. | |
| 2015/0092633 A1 | 4/2015 | Papasakellariou et al. | |
| 2015/0230242 A1 | 8/2015 | Papasakellariou et al. | |
| 2016/0233999 A1* | 8/2016 | Chendamarai Kannan | H04L 5/0055 |
| 2016/0261391 A1* | 9/2016 | Chen | H04L 5/0048 |
| 2018/0006791 A1* | 1/2018 | Marinier | H04L 1/0026 |

FOREIGN PATENT DOCUMENTS

| | | |
|---|---|---|
| CN | 102611538 A | 7/2012 |
| CN | 103095432 A | 5/2013 |
| CN | 103404067 A | 11/2013 |
| CN | 103516496 A | 1/2014 |
| WO | 2012060649 A3 | 6/2012 |

OTHER PUBLICATIONS

English Translation of the Written Opinion of the International Search Authority in international application No. PCT/CN2016/079789, dated Jul. 8, 2016, 6 pgs.
Supplementary European Search Report in European application No. 16795776.0, dated Apr. 24, 2018, 9 pgs.

* cited by examiner

HARQ SENDING AND RECEIVING METHODS AND DEVICES, AND NODE

CROSS-REFERENCE TO RELATED APPLICATIONS

The present disclosure claims priority to Chinese Patent Application No. 201510251369.4 filed on May 15, 2015, entitled "HARQ (Hybrid Automatic Repeat Request) sending method and device, HARQ receiving method and device, and node", the disclosure of which is incorporated by reference herein in its entirety.

TECHNICAL FIELD

The present disclosure relates to, but not limited to, the field of communications.

BACKGROUND

In order to increase a peak rate and user experience of a user, a node 1 (for example, a terminal or a base station) is usually not limited to receive data sent by a node 2 (for example, the base station or the terminal) on one carrier and one process. Correspondingly, the node 1 is required to feed back Hybrid Automatic Repeat Request (HARQ) information to the node 2. That is, whether a transmission block on each carrier/process is correct is detected. If the transmission block is correct, an Acknowledgement (ACK) is fed back. Otherwise, a Negative Acknowledgement (NACK) is fed back.

In a Long Time Evolution (LTE) system of the 3rd Generation Partnership Project (3GPP), the terminal (the node 1) is required to feed back the HARQ information according to a number of carriers configured by the base station (the node 2) and a transmission mode of each carrier. If the transmission modes of the carriers adopt a space multiplexing mode, for example, each carrier has two transmission blocks, 2-bit HARQ information is required to be fed back for each carrier. Otherwise, 1-bit HARQ information (each carrier has one transmission block) is required to be fed back for each carrier. For example, in case that a network configures five carriers to the terminal and a transmission mode of each carrier is the space multiplexing mode, the terminal is required to feed back 10-bit HARQ information to the network in an uplink subframe.

In addition, if the carriers are Time Division Duplexing (TDD) carriers, the terminal is further required to feed back the HARQ information according to uplink and downlink configurations of the carriers. For example, if the network configures a TDD carrier to the terminal and an uplink and downlink configuration of the carrier is a configuration 5, the terminal is required to feed back HARQ information (one transmission block for each subframe, totally nine bits) of nine downlink subframes in the uplink subframe. For another example, in case that the network configures two TDD carriers to the terminal, uplink and downlink configurations of the carriers are both the configuration 5, the terminal is required to feed back HARQ information (18 bits) of 18 downlink subframes in the uplink subframe. However, in carrier aggregation enhancement research projects of the 3GPP in a related technology, the node 2 may configure up to 32 carriers to the node 1. For Frequency Division Duplexing (FDD), in case of non-space multiplexing, HARQ information required to be fed back is 32 bits, and in case of space multiplexing, a bit number of HARQ information required to be fed back is 64. For TDD, the number of bits of a HARQ required to be fed back is related to uplink and downlink configuration information. In case of the uplink and downlink configuration 5, the number of bits of HARQ information required to be fed back is up to 288.

In the related technology, for reasons such as reducing control signaling overhead and power consumption, improving coverage, reducing implementation complexity and the like, the node 1 is usually required to reduce the number of bits of the HARQ information required to be fed back to the node 2. A common method for this is to bind HARQ information of multiple transmission blocks on the same predefined time domain or space domain. For example, pieces of HARQ information of two transmission blocks on a time domain or space domain of the same carrier are bound. When it is detected that both of the two transmission blocks are correct, a 1-bit ACK is fed back. Otherwise, a 1-bit NACK is fed back. In such a manner, HARQ feedback overhead may be reduced to be a half of the original.

SUMMARY

Here shows the overview of a subject matter of the present disclosure to be described in detail in the following. The overview is not intended to limit the scope of protection of the claims.

The inventor finds in a research process that the manner of the related technology also has great limitations, which are reflected as follows.

If only one of the bound transmission blocks is incorrect, the node 2 fails to determine, according to the HARQ information fed back by the node 1, which one of the bound transmission blocks is detected to be incorrect. As insurance, all the bound transmission blocks are to be retransmitted. Such resource waste may bring negative influence on a throughput of a downlink system. Moreover, the bound transmission blocks are relatively strongly correlated, while channels of different carriers are independent from each other. In the related technology, when the node 2 sends data to the node 1 on multiple carriers, if the transmission block binding method is still adopted to bind HARQ information of transmission blocks on the multiple carriers, the negative influence on the throughput of the system may be further magnified.

The disclosure provides HARQ sending and receiving methods and devices and a node.

According to an aspect of embodiments of the disclosure, a HARQ sending method is provided, which may include the following steps. A receiving condition of N transmission blocks is detected. A first HARQ state value with a length of M bits is generated according to the receiving condition. The first HARQ state value has a plurality of optional values, each corresponding to a respective receiving condition of the N transmission blocks when k falls within a preset value range, k may be a number of transmission blocks which are correctly received in the received transmission blocks, M, N and k may be integers, $2 \leq M < N$, and $0 \leq k \leq N$; and the first HARQ state value is sent as HARQ information.

Optionally, the step of generating the first HARQ state value with the length of M bits according to the receiving condition may include the following steps. Whether k falls within the preset value range or not is judged. When it is judged that k fall within the preset value range, the first HARQ state value with the length of M bits is generated according to the receiving condition.

Optionally, the method may further include the following steps. When it is judged that k does not fall within the preset value range, a second HARQ state value with a length of W bits is generated according to the receiving condition, where at least one value in all values of the second HARQ state value may be configured to represent at least two receiving conditions of the N transmission blocks when k does not fall within the preset value range, and $2 \leq W \leq M$. The second HARQ state value is sent as the HARQ information.

Optionally, the first HARQ state value and the second HARQ state value may be sent as the HARQ information in a same channel format or in different channel formats.

Optionally, the preset value range, a corresponding relationship between all the values of the first HARQ state value and the receiving conditions of the N transmission blocks and a corresponding relationship between all the values of the second HARQ state value and the receiving conditions of the N transmission blocks may be preconfigured at a sender of the transmission blocks and a receiver of the transmission blocks. Alternatively, the preset value range, the corresponding relationship between all the values of the first HARQ state value and the receiving conditions of the N transmission blocks and the corresponding relationship between all the values of the second HARQ state value and the receiving conditions of the N transmission blocks may be determined by negotiation between the sender and the receiver.

Optionally, the preset value range may include: integers more than or equal to a threshold U and less than or equal to N, wherein $1 \leq U \leq N$; or integers more than or equal to a threshold $U_1$ and less than or equal to $U_2$, where $1 \leq U_1 \leq U_2 \leq N$; or a threshold set H, where each element h in H may meet $1 \leq h < N$.

Optionally, U may be an integer meeting $$\log_2\left(1 + \sum_{k=U}^{N} C_N^k\right) \leq M;$$

$U_1$ and $U_2$ may be integers meeting $$\log_2\left(1 + \sum_{k=U_1}^{U_2} C_N^k\right) \leq M;$$

and the elements h in H may be positive integers meeting $$\log_2\left(1 + \sum_{h \in H} C_N^h\right) \leq M.$$

Optionally, U may be a minimum integer meeting $$\log_2\left(1 + \sum_{k=U}^{N} C_N^k\right) \leq M,$$

or, $U = aN$, where $$\frac{1}{N} \leq a < 1;$$

and $U_1$ and $U_2$ may be integers meeting $$\log_2\left(1 + \sum_{k=U_1}^{U_2} C_N^k\right) \leq M$$

and making $U_2 - U_1$ maximum, or, $U_1 = bN$ and $U_2 = cN$, where $$\frac{1}{N} \leq b \leq c < 1.$$

Optionally, when the preset value range is the integers more than or equal to the threshold U and less than or equal to N, the step of generating the first HARQ state value with the length of M bits according to the receiving condition may include the following steps. Whether $U \leq k \leq N$ is true is judge. When it is judged that $U \leq k \leq N$, the first HARQ state value is determined from $$\sum_{k=U}^{N} C_N^k$$

values, where each value in the $$\sum_{k=U}^{N} C_N^k$$

values of the first HARQ state value may correspond to a receiving condition of the N transmission blocks when $U \leq k \leq N$ one to one. The determined first HARQ state value is generated.

Optionally, the method may further include the following steps. When it is judged that $0 \leq k < U$ is true, the second HARQ state value is determined from S values, where at least one value in the S values of the second HARQ state value may be configured to represent at least two receiving conditions of the N transmission blocks when $0 \leq k < U$, S may be an integer, $$0 < S \leq \left(2^M - \sum_{k=U}^{N} C_N^k\right)$$

and $\log_2(S) \leq W$. The determined second HARQ state value is generated; and the second HARQ state value is sent as the HARQ information.

Optionally, when the preset value range is the integers more than or equal to the threshold $U_1$ and less than or equal to $U_2$, the step of generating the first HARQ state value with the length of M bits according to the receiving condition may include the following steps. Whether $U_1 \leq k \leq U_2$ is true or not is judged. When it is judged that $U_1 \leq k \leq U_2$, the first HARQ state value is determined from $$\sum_{k=U_1}^{U_2} C_N^k$$

values, where each value in the $$\sum_{k=U_1}^{U_2} C_N^k$$

values of the first HARQ state value may correspond to a receiving condition of the N transmission blocks when $U_1 \leq k \leq U_2$ one to one. The determined first HARQ state value is generated.

Optionally, the method may further include the following steps. When it is judged that $0 \leq k < U_1$ or $U_2 < k \leq N$ is true, the second HARQ state value is determined from T values, where at least one value in the T values of the second HARQ state value may be configured to represent at least two receiving conditions of the N transmission blocks when $0 \leq k < U_1$ or $U_2 < k \leq N$, T may be an integer, $$0 < T \leq \left(2^M - \sum_{k=U_1}^{U_2} C_N^k\right)$$

and $\log_2(T) \leq W$. The determined second HARQ state value is generated; and the second HARQ state value is sent as the HARQ information.

Optionally, when the preset value range is the threshold set H, the step of generating the first HARQ state value with the length of M bits according to the receiving condition may include the following steps. Whether $k \in H$ is true is judged. When it is judged that $k \in H$ is true, the first HARQ state value is determined from $$\sum_{h \in H} C_N^h$$

values, where each value in the $$\sum_{h \in H} C_N^h$$

values of the first HARQ state value may correspond to a receiving condition of the N transmission blocks when $k \in H$ one to one. The determined first HARQ state value is generated.

Optionally, the method may further include the following steps. When it is judged that $k \notin H$ is true, the second HARQ state value is determined from R values, where at least one value in the R values of the second HARQ state value may be configured to represent at least two receiving conditions of the N transmission blocks when $k \notin H$, R may be an integer, $$0 < R \leq \left(2^M - \sum_{h \in H} C_N^h\right)$$

and $\log_2(R) \leq W$. The determined second HARQ state value is generated; and the second HARQ state value is sent as the HARQ information.

Optionally, the N transmission blocks may be positioned on multiple carriers respectively.

According to another aspect of the embodiments of the disclosure, a HARQ receiving method is further provided, which may include the following steps. A first HARQ state value with a length of M bits is received, where the first HARQ state value has a plurality of optional values, each corresponding to a respective receiving condition of N transmission blocks when k falls within a preset value range, k may be a number of transmission blocks which are correctly received in the received transmission blocks, M, N and k may be integers, $2 \leq M < N$, and $0 \leq k \leq N$. A receiving condition of a receiver for the N transmission blocks is determined according to the first HARQ state value.

Optionally, the method may further include the following steps. A second HARQ state value with a length of W bits is received, where at least one value in all values of the second HARQ state value may be adopted to represent at least two receiving conditions of the N transmission blocks when k does not fall within the preset value range, and $2 \leq W \leq M$. The receiving condition of the receiver for the N transmission blocks is determined according to the second HARQ state value.

According to another aspect of the embodiments of the disclosure, a HARQ sending device is further provided, which may include a detection module, a first generation module and a first sending module. The detection module is configured to detect a receiving condition of N transmission blocks. The first generation module is configured to generate a first HARQ state value with a length of M bits according to the receiving condition, where the first HARQ state value has a plurality of optional values, each corresponding to a respective receiving condition of the N transmission blocks when k falls within a preset value range, k may be a number of transmission blocks which are correctly received in the received transmission blocks, M, N and k may be integers, $2 \leq M < N$, and $0 \leq k \leq N$. The first sending module is configured to send the first HARQ state value as HARQ information.

Optionally, the first generation module may include a judgment unit and a generation unit. The judgment unit is configured to judge whether k falls within the preset value range. The generation unit is configured to, when the judgment unit judges that k falls within the preset value range, generate the first HARQ state value with the length of M bits according to the receiving condition.

Optionally, the device may further include a second generation module and a second sending module. The second generation module is configured to, when the judgment unit judges that k does not fall within the preset value range, generate a second HARQ state value with a length of W bits according to the receiving condition, where at least one value in all values of the second HARQ state value may be configured to represent at least two receiving conditions of the N transmission blocks when k does not fall within the preset value range, and $2 \leq W \leq M$. The second sending module is configured to send the second HARQ state value as the HARQ information.

Optionally, in the first sending module and the second sending module, the first HARQ state value and the second HARQ state value may be sent as the HARQ information in a same channel format or in different channel formats.

Optionally, the preset value range, a corresponding relationship between all the values of the first HARQ state value and the receiving conditions of the N transmission blocks and a corresponding relationship between all the values of the second HARQ state value and the receiving conditions of the N transmission blocks may be preconfigured at a sender of the transmission blocks and a receiver of the transmission blocks. Alternatively, the preset value range, the corresponding relationship between all the values of the first HARQ state value and the receiving conditions of the N transmission blocks and the corresponding relationship between all the values of the second HARQ state value and the receiving conditions of the N transmission blocks may be determined by negotiation between the sender and the receiver.

Optionally, the preset value range may include: integers more than or equal to a threshold U and less than or equal to N, wherein $1 \leq U \leq N$; or integers more than or equal to a threshold $U_1$ and less than or equal to $U_2$, wherein $1 \leq U_1 \leq U_2 \leq N$; or a threshold set H, wherein each element h in H may meet $1 \leq h < N$.

Optionally, U may be an integer meeting $$\log_2\left(1 + \sum_{k=U}^{N} C_N^k\right) \leq M;$$

$U_1$ and $U_2$ may be integers meeting $$\log_2\left(1 + \sum_{k=U_1}^{U_2} C_N^k\right) \leq M;$$

and the elements h in H may be positive integers meeting $$\log_2\left(1 + \sum_{h \in H} C_N^h\right) \leq M.$$

Optionally, U may be a minimum integer meeting $$\log_2\left(1 + \sum_{k=U}^{N} C_N^k\right) \leq M,$$

or, $U=aN$, where $$\frac{1}{N} \leq a < 1;$$

and $U_1$ and $U_2$ may be integers meeting $$\log_2\left(1 + \sum_{k=U_1}^{U_2} C_N^k\right) \leq M$$

and making $U_2-U_1$ maximum, or, $U_1=bN$ and $U_2=cN$, where $$\frac{1}{N} \leq b \leq c < 1.$$

Optionally, the judgment unit may be configured to, when the preset value range is the integers more than or equal to the threshold U and less than or equal to N, judge whether $U \leq k \leq N$ is true; and the generation unit may be configured to, when the judgment unit judges that $U \leq k \leq N$, determine the first HARQ state value from $$\sum_{k=U}^{N} C_N^k$$

values, where each value in the $$\sum_{k=U}^{N} C_N^k$$

values of the first HARQ state value may correspond to a receiving condition of the N transmission blocks when $U \leq k \leq N$ one to one, and generate the determined first HARQ state value.

Optionally, the device may further include: a second generation module and a second sending module. The second generation module is configured to, when the judgment unit judges that $0 \leq k < U$, determine the second HARQ state value from S values, where at least one value in the S values of the second HARQ state value may be configured to represent at least two receiving conditions of the N transmission blocks when $0 \leq k < U$, S may be an integer, $$0 < S \leq \left(2^M - \sum_{k=U}^{N} C_N^k\right)$$

and $\log_2(S) \leq W$, and generate the determined second HARQ state value. The second sending module is configured to send the second HARQ state value as the HARQ information.

Optionally, the judgment unit may be configured to, when the preset value range is the integers more than or equal to the threshold $U_1$ and less than or equal to $U_2$, judge whether $U_1 \leq k \leq U_2$ is true. The generation unit may be configured to, when the judgment unit judges that $U_1 \leq k \leq U_2$, determine the first HARQ state value from $$\sum_{k=U_1}^{U_2} C_N^k$$

values, where each value in the $$\sum_{k=U_1}^{U_2} C_N^k$$

values of the first HARQ state value may correspond to a receiving condition of the N transmission blocks when $U_1 \leq k \leq U_2$ one to one, and generate the determined first HARQ state value.

Optionally, the device may further include a second generation module and a second sending module. The second generation module is configured to, when the judgment unit judges that $0 \leq k < U_1$ or $U_2 < k \leq N$, determine the second HARQ state value from T values, where at least one value in the T values of the second HARQ state value may be configured to represent at least two receiving conditions of the N transmission blocks when $0 \le k < U_1$ or $U_2 < k \le N$, T may be an integer, $$0 < T \le \left(2^M - \sum_{k=U_1}^{U_2} C_N^k\right)$$

and $\log_2(T) \le W$, and generate the determined second HARQ state value. The second sending module is configured to send the second HARQ state value as the HARQ information.

Optionally, the judgment unit may be configured to, when the preset value range is the threshold set H, judge whether $k \in H$ is true. The generation unit may be configured to, when the judgment unit judges that $k \in H$, determine the first HARQ state value from $$\sum_{h \in H} C_N^h$$

values, where each value in the $$\sum_{h \in H} C_N^h$$

values of the first HARQ state value may correspond to a receiving condition of the N transmission blocks when $k \in H$ one to one, and generate the determined first HARQ state value.

Optionally, the device may further include a second generation module and a second sending module. The second generation module is configured to, when the judgment unit judges that $k \notin H$, determine the second HARQ state value from R values, wherein at least one value in the R values of the second HARQ state value may be configured to represent at least two receiving conditions of the N transmission blocks when $k \notin H$, R may be an integer, $$0 < R \le \left(2^M - \sum_{h \in H} C_N^h\right)$$

and $\log_2(R) \le W$, and generate the determined second HARQ state value. The second sending module is configured to send the second HARQ state value as the HARQ information.

Optionally, the N transmission blocks may be positioned on multiple carriers respectively.

According to another aspect of the embodiments of the disclosure, a HARQ receiving device is further provided, which may include a first receiving module and a first determination module. The first receiving module is configured to receive a first HARQ state value with a length of M bits, where the first HARQ state value has a plurality of optional values, each corresponding to a respective receiving condition of N transmission blocks when k falls within a preset value range, k may be a number of transmission blocks which are correctly received in the received transmission blocks, M, N and k may be integers, $2 \le M < N$ and $0 \le k \le N$. The first determination module is configured to determine a receiving condition of a receiver for the N transmission blocks according to the first HARQ state value.

Optionally, the device may further include a second receiving module and a second determination module. The second receiving module is configured to receive a second HARQ state value with a length of W bits, where at least one value in all values of the second HARQ state value may be configured to represent at least two receiving conditions of the N transmission blocks when k does not fall within the preset value range, and $2 \le W \le M$. The second determination module is configured to determine the receiving condition of the receiver for the N transmission blocks according to the second HARQ state value.

According to another aspect of the embodiments of the disclosure, a node is further provided, which may include: the abovementioned HARQ sending device, and/or, the abovementioned HARQ receiving device.

According to another aspect of the embodiments of the disclosure, a computer-readable storage medium is further provided, which may store a computer-executable instruction, the computer-executable instruction being configured to execute any abovementioned method.

According to the embodiments of the disclosure, the receiving condition of the N transmission blocks is detected. The first HARQ state value with the length of M bits is generated according to the receiving condition. Each value in all the values of the first HARQ state value may correspond to a receiving condition of the N transmission blocks when k falls within the preset value range one to one, k is the number of the transmission blocks which are correctly received in the received transmission blocks, M, N and k are integers, $2 \le M < N$, and $0 \le k \le N$; and the first HARQ state value is sent as the HARQ information. The problem of high occupied overhead for feedback of the HARQ information is solved, and the overhead for feedback of the HARQ information is reduced.

Other aspects will be understood upon reading and understanding of the appended drawings and detailed descriptions.

DETAILED DESCRIPTION

Implementation modes of the disclosure will be described below with reference to the drawings and in combination with the embodiments in detail. It is important to note that the embodiments in the disclosure and characteristics in the embodiments may be combined without conflicts.

In order to make the solutions of the disclosure better understood by those skilled in the art, the technical solutions in the embodiments of the disclosure will be clearly and completely described below in combination with the drawings in the embodiments of the disclosure. Obviously, the described embodiments are not all embodiments but only a part of embodiments of the disclosure. All other embodiments obtained by those skilled in the art on the basis of the embodiments in the disclosure without creative work shall fall within the scope of protection of the disclosure.

Figure 1:
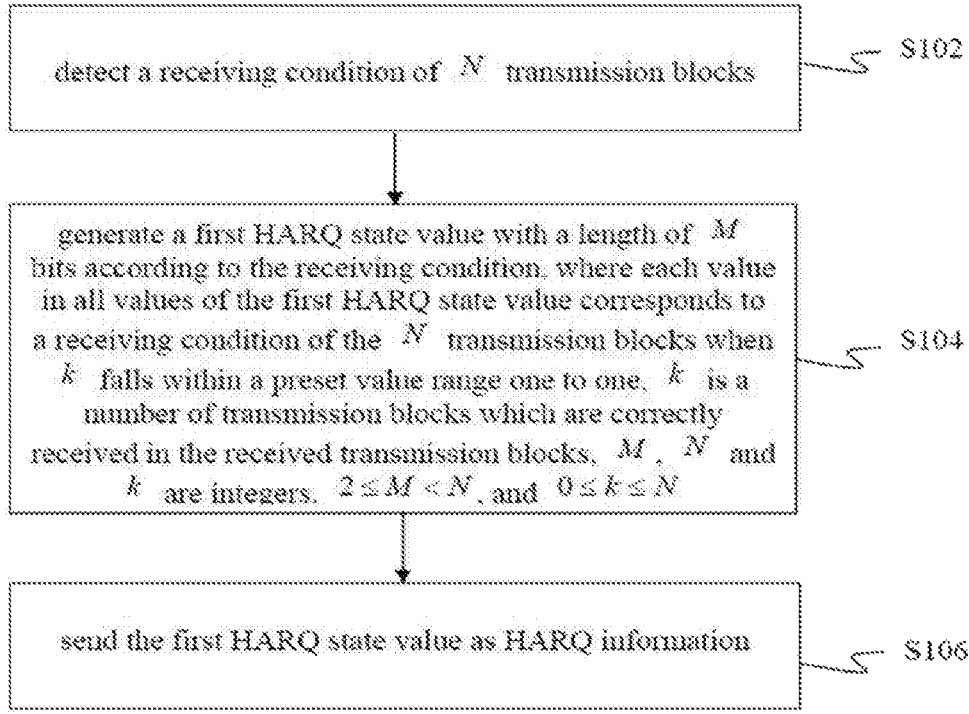
FIG. 1 is a flowchart of a HARQ sending method according to an embodiment of the disclosure.

An embodiment of the disclosure provides a HARQ sending method. FIG. 1 is a flowchart of a HARQ sending method according to an embodiment of the disclosure. As shown in FIG. 1, the flow includes the following steps.

In Step S102, a receiving condition of N transmission blocks is detected.

In Step S104, a first HARQ state value with a length of M bits is generated according to the receiving condition. The first HARQ state value has a plurality of optional values, each corresponding to a respective receiving condition of the N transmission blocks when k falls within a preset value range. The k is a number of transmission blocks which are correctly received in the received transmission blocks, M, N and k are integers, $2 \leq M < N$, and $0 \leq k \leq N$.

In Step S106, the first HARQ state value is sent as HARQ information.

By the above steps, the receiving condition of the transmission blocks when the number of the transmission blocks which are correctly received in the N transmission blocks falls within the preset value range is represented by the first HARQ state value which includes values fewer than N bits and has the length of M bits. Therefore, a bit length of the HARQ information is reduced to be M, the problem of high occupied overhead for feedback of the HARQ information is solved, and the overhead for feedback of the HARQ information is reduced.

A node 1 and a node 2 make an agreement on adoption of the M bits for feedback of the HARQ information of the N transmission blocks. The receiving condition of the N transmission blocks includes a condition of sequentially determining whether each transmission block is correctly received according to an index of the transmission block for the N given transmission blocks. In case that a receiver receives four transmission blocks of "a transmission block 1, a transmission block 2, a transmission block 3 and a transmission block 4", when three of the four transmission blocks are correctly received, four receiving conditions may be detected by the receiver, i.e. "incorrect, correct, correct and correct", "correct, incorrect, correct and correct", "correct, correct, incorrect and correct" and "correct, correct, correct and incorrect" respectively. It is important to note here that, under some conditions, for example, according to some strategies or in case that a channel condition is poor, the number of transmission blocks received by the receiver is smaller than N. Then, a transmission block fails to be received may be processed in a manner as same as a transmission block received incorrectly. For example, in case that the third transmission block in the four transmission blocks is not sent by a sender, or is not received by the receiver and the other transmission blocks are all correctly received, the receiving condition of "correct, correct, lost and correct" is equivalent to the receiving condition "correct, correct, incorrect and correct".

It is important to note that M may be a preset constant value.

In some embodiments, a predetermined value which has a length of M bits and does not represent any receiving condition of the N transmission blocks when k falls within the preset value range may be adopted to indicate the receiving condition when k does not fall within the preset value range. A dedicated message is adopted to notify the sender to retransmit all the transmission blocks when k does not fall within the preset value range.

Optionally, the Step S104 may be performed as follows. Whether k falls within the preset value range is judged. When it is judged that k falls within the preset value range, the first HARQ state value with the length of M bits is generated according to the receiving condition.

Optionally, The predetermined value which has the length of M bits and does not represent any receiving condition of the N transmission blocks when k falls within the preset value range is adopted to indicate the receiving condition when k does not fall within the preset value range. In this case, after whether k falls within the preset value range or not is judged and it is judged that k does not fall within the preset value range, a second HARQ state value with a length of W bits may further be generated according to the receiving condition. At least one value in all values of the second HARQ state value is adopted to represent at least two receiving conditions of the N transmission blocks when k does not fall within the preset value range, and $2 \leq W \leq M$; and the second HARQ state value is sent to the sender as the HARQ information.

Optionally, the first HARQ state value and the second HARQ state value may be sent in a same channel format or in different channel formats. The number of bits of HARQ state values bearable in the different channel formats may be different. Optionally, the preset value range may be: integers more than or equal to a threshold U and less than or equal to N, wherein $1 \leq U \leq N$.

Optionally, in the preset value range, U may have various values. For example, U is an integer meeting $$\log_2\left(1 + \sum_{k=U}^{N} C_N^k\right) \leq M.$$

Wherein, as an optional value, U is a minimum integer meeting $$\log_2\left(1 + \sum_{k=U}^{N} C_N^k\right) \leq M,$$

or, U=aN, where $$\frac{1}{N} \leq a < 1.$$

In the embodiment of the disclosure, $\Sigma$ is a summation symbol. For example, $C_N^k$ represents a number of combined forms in k selected from N elements.

Optionally, the preset value range may be: integers more than or equal to a threshold $U_1$ and less than or equal to $U_2$, where $1 \leq U_1 \leq U_2 \leq N$.

Optionally, in the preset value range, $U_1$ and $U_2$ may have various values. For example, $U_1$ and $U_2$ are integers meeting $$\log_2\left(1 + \sum_{k=U_1}^{U_2} C_N^k\right) \le M.$$

Wherein, as optional values, $U_1$ and $U_2$ are integers meeting $$\log_2\left(1 + \sum_{k=U_1}^{U_2} C_N^k\right) \le M$$

and making $U_2 - U_1$ maximum, or, $U_1 = bN$ and $U_2 = cN$, where $$\frac{1}{N} \le b \le c < 1.$$

Optionally, the preset value range is a threshold set, where each element h in H meets $1 \le h < N$. For example, the elements h in H are positive integers meeting $$\log_2\left(1 + \sum_{h \in H} C_N^h\right) \le M.$$

Optionally, the values of a, b and c may be determined when a probability of correctly receiving k or more than k transmission blocks in the N transmission blocks is higher than a preset probability.

When the bit length of the fed back HARQ information (i.e. the first HARQ state value or the second HARQ state value) is a constant value, M being equal to W; and when the bit length of the fed back HARQ information is not a constant value, M being equal to a maximum value of W.

Optionally, the preset value range, a corresponding relationship between all the values of the first HARQ state value and the receiving conditions of the N transmission blocks and a corresponding relationship between all the values of the second HARQ state value and the receiving conditions of the N transmission blocks are preconfigured at the sender of the transmission blocks and the receiver of the transmission blocks.

Or, the preset value range, the corresponding relationship between all the values of the first HARQ state value and the receiving conditions of the N transmission blocks and the corresponding relationship between all the values of the second HARQ state value and the receiving conditions of the N transmission blocks are determined by negotiation between the sender and the receiver. For example, the sender notifies, the receiver, of the preset value range, the corresponding relationship between all the values of the first HARQ state value and the receiving conditions of the N transmission blocks and the corresponding relationship between all the values of the second HARQ state value and the receiving conditions of the N transmission blocks. Alternatively, the receiver notifies, sender, of the preset value range, the corresponding relationship between all the values of the first HARQ state value and the receiving conditions of the N transmission blocks and the corresponding relationship between all the values of the second HARQ state value and the receiving conditions of the N transmission blocks.

Optionally, when the preset value range is the integers more than or equal to the threshold U and less than or equal to N, Step S104 may include the following steps. Whether $U \le k \le N$ is true is judged. When it is judged that $U \le k \le N$, the first HARQ state value is determined from $$\sum_{k=U}^{N} C_N^k$$

values. Each value in the $$\sum_{k=U}^{N} C_N^k$$

values of the first HARQ state value corresponds to a receiving condition of the N transmission blocks when $U \le k \le N$ one to one; and the determined first HARQ state value is generated.

Optionally, after whether $U \le k \le N$ is true is judged, the method may further include the following steps. When it is judged that $0 \le k < U$, the second HARQ state value is determined from S values. At least one value in the S values of the second HARQ state value is adopted to represent at least two receiving conditions of the N transmission blocks when $0 \le k < U$, S is an integer, $$0 < S \le \left(2^M - \sum_{k=U}^{N} C_N^k\right)$$

and $\log_2(S) \le W$. The determined second HARQ state value is generated; and the second HARQ state value is sent to the sender as the HARQ information.

Optionally, when the preset value range is the integers more than or equal to the threshold $U_1$ and less than or equal to $U_2$, Step S104 may include the following steps. Whether $U_1 \le k \le U_2$ is true is judged. When it is judged that $U_1 \le k \le U_2$, the first HARQ state value is determined from $$\sum_{k=U_1}^{U_2} C_N^k$$

values. Each value in the $$\sum_{k=U_1}^{U_2} C_N^k$$

values of the first HARQ state value corresponds to a receiving condition of the N transmission blocks when $U_1 \le k \le U_2$ one to one; and the determined first HARQ state value is generated.

Optionally, after whether $U_1 \le k \le U_2$ is true is judged, the method may further include the following steps. When it is judged that $0 \le k < U_1$ or $U_2 < k \le N$, the second HARQ state value is determined from T values. At least one value in the T values of the second HARQ state value is adopted to represent at least two receiving conditions of the N transmission blocks when $0 \leq k < U_1$ or $U_2 < k \leq N$, T is an integer, $$0 < T \leq \left(2^M - \sum_{k=U_1}^{U_2} C_N^k\right)$$

and $\log_2(T) \leq W$. The determined second HARQ state value is generated; and the second HARQ state value is sent as the HARQ information.

Optionally, when the preset value range is the threshold set H, Step S104 may include the following steps. Whether $k \in H$ is true is judged. When it is judged that $k \in H$, the first HARQ state value is determined from $$\sum_{h \in H} C_N^h$$

values. Each value in the $$\sum_{h \in H} C_N^h$$

values of the first HARQ state value corresponds to a receiving condition of the N transmission blocks when $k \in H$ one to one; and the determined first HARQ state value is generated.

Optionally, the method may further include the following steps. When it is judged that $k \notin H$, the second HARQ state value is determined from R values. At least one value in the R values of the second HARQ state value is adopted to represent at least two receiving conditions of the N transmission blocks when $k \notin H$ R is an integer, $$0 < R \leq \left(2^M - \sum_{h \in H} C_N^h\right)$$

and $\log_2(R) \leq W$. The determined second HARQ state value is generated; and the second HARQ state value is sent as the HARQ information.

Optionally, the N transmission blocks may be positioned on the same carrier, and may also be positioned on multiple carriers respectively.

An embodiment of the disclosure further provides a computer-readable storage medium, which stores a computer-executable instruction, the computer-executable instruction being configured to execute the HARQ sending method.

Figure 2:
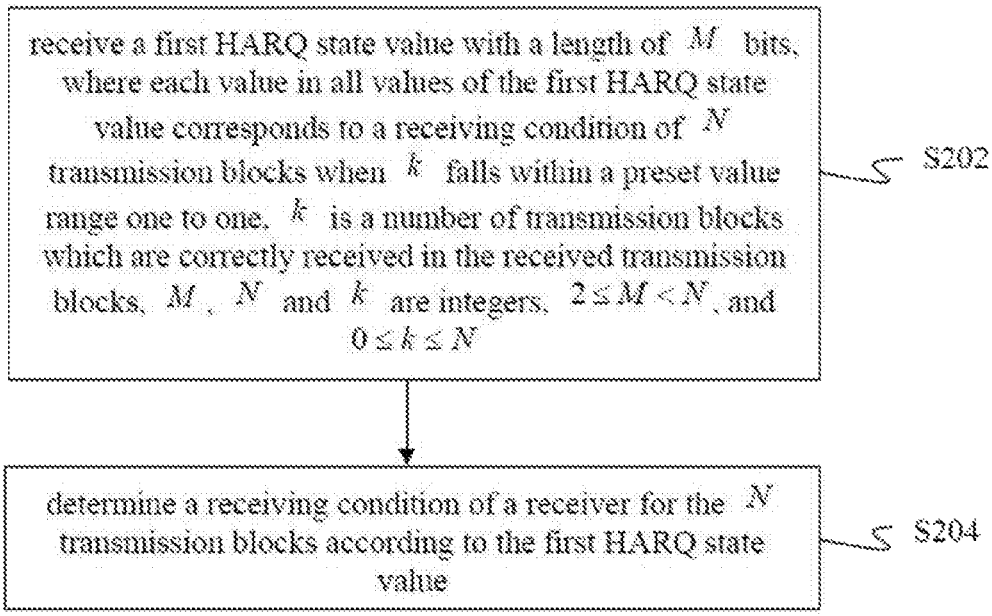
FIG. 2 is a flowchart of a HARQ receiving method according to an embodiment of the disclosure.

An embodiment further provides a HARQ receiving method. FIG. 2 is a flowchart of a HARQ receiving method according to an embodiment of the disclosure. As shown in FIG. 2, the flow includes the following steps.

In Step S202, a first HARQ state value with a length of M bits is received. The first HARQ state value has a plurality of optional values, each corresponding to a respective receiving condition of N transmission blocks when k falls within a preset value range, k is a number of transmission blocks which are correctly received in the received transmission blocks, M, N and k are integers, $2 \leq M < N$, and $0 \leq k \leq N$.

In Step S204, a receiving condition of a receiver for the N transmission blocks is determined according to the first HARQ state value.

By the above steps, the first HARQ state value with the length of M bits is adopted to represent the receiving condition of the N transmission blocks when k falls within the preset value range, the problem of high occupied overhead for feedback of HARQ information is solved, and the overhead for feedback of the HARQ information is reduced.

Optionally, the method further includes the following steps. A second HARQ state value with a length of W bits is received. At least one value in all values of the second HARQ state value is adopted to represent at least two receiving conditions of the N transmission blocks when k does not fall within the preset value range, and $2 \leq W \leq M$. The receiving condition of the receiver for the N transmission blocks is determined according to the second HARQ state value.

An embodiment of the disclosure further provides a computer-readable storage medium, which stores a computer-executable instruction, the computer-executable instruction being configured to execute the HARQ receiving method.

An embodiment further provides a HARQ sending device, which is configured to implement the HARQ sending method, and what has been described will not be elaborated. Modules involved in the device will be described below. For example, term "module", used below, may be a combination of software and/or hardware capable of realizing a preset function. Although the device described in the following embodiment may be implemented with software, implementation with hardware or a combination of the software and the hardware is also possible and conceivable.

Figure 3:
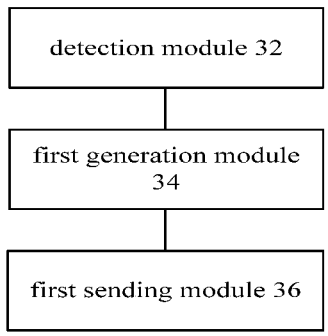
FIG. 3 is a structure diagram of a HARQ sending device according to an embodiment of the disclosure.

FIG. 3 is a structure diagram of a HARQ sending device according to an embodiment of the disclosure. As shown in FIG. 3, the device includes: a detection module 32, a first generation module 34 and a first sending module 36. The detection module 32 is configured to detect a receiving condition of N transmission blocks. The first generation module 34 is coupled to the detection module 32, and is configured to generate a first HARQ state value with a length of M bits according to the receiving condition. The first HARQ state value has a plurality of optional values, each corresponding to a respective receiving condition of the N transmission blocks when k falls within a preset value range, k is a number of transmission blocks which are correctly received in the received transmission blocks, M, N and k are integers, $2 \leq M < N$, and $0 \leq k \leq N$. The first sending module 36 is coupled to the first generation module 34, and is configured to send the first HARQ state value as HARQ information.

By a combined action of the modules, the problem of high occupied overhead for feedback of the HARQ information is solved, and the overhead for feedback of the HARQ information is reduced.

Figure 4:
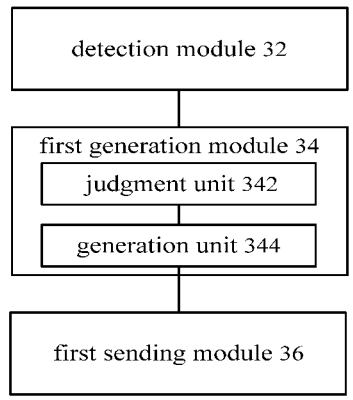
FIG. 4 is a first optional structure diagram of a HARQ sending device according to an embodiment of the disclosure.

FIG. 4 is a first optional structure diagram of a HARQ sending device according to an embodiment of the disclosure. As shown in FIG. 4, optionally, the first generation module 34 may include a judgment unit 342 and a generation unit 344. The judgment unit 342 is configured to judge whether k falls within the preset value range. The generation unit 344 is coupled to the judgment unit 342 and configured to, when the judgment unit 342 judges that k falls within the preset value range, generate the first HARQ state value with the length of M bits according to the receiving condition.

Figure 5:
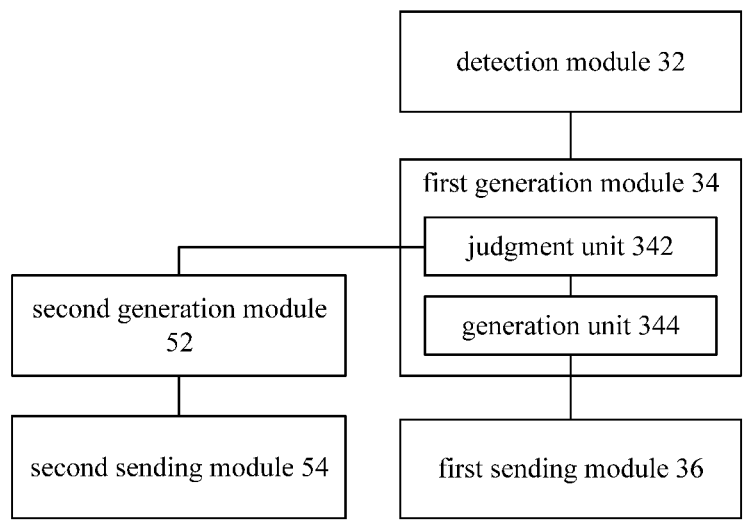
FIG. 5 is a second optional structure diagram of a HARQ sending device according to an embodiment of the disclosure.

FIG. 5 is a second optional structure diagram of a HARQ sending device according to an embodiment of the disclosure. As shown in FIG. 5, optionally, the device further includes a second generation module 52 and a second sending module 54. The second generation module 52 is coupled to the judgment unit 342 and configured to, when the judgment unit 342 judges that k does not fall within the preset value range, generate a second HARQ state value with a length of W bits according to the receiving condition. At least one value in all values of the second HARQ state value is adopted to represent at least two receiving conditions of the N transmission blocks when k does not fall within the preset value range, and $2 \leq W \leq M$. The second sending module 54 is coupled to the second generation module 52 and configured to send the second HARQ state value as the HARQ information.

Optionally, in the first sending module 36 and the second sending module 54, the first HARQ state value and the second HARQ state value are sent as the HARQ information in a same channel format. Alternatively, the first HARQ state value and the second HARQ state value are sent as the HARQ information in different channel formats.

Optionally, the preset value range, a corresponding relationship between all the values of the first HARQ state value and the receiving conditions of the N transmission blocks and a corresponding relationship between all the values of the second HARQ state value and the receiving conditions of the N transmission blocks are preconfigured at a sender of the transmission blocks and a receiver of the transmission blocks.

Alternatively, the preset value range, the corresponding relationship between all the values of the first HARQ state value and the receiving conditions of the N transmission blocks and the corresponding relationship between all the values of the second HARQ state value and the receiving conditions of the N transmission blocks are determined by negotiation between the sender and the receiver.

Optionally, the preset value range includes: integers more than or equal to a threshold U and less than or equal to N, wherein $1 \leq U \leq N$; or integers more than or equal to a threshold $U_1$ and less than or equal to $U_2$, wherein $1 \leq U_1 \leq U_2 \leq N$; or a threshold set H, wherein each element h in H meets $1 \leq h < N$.

Optionally, U is an integer meeting $$\log_2\left(1 + \sum_{k=U}^{N} C_N^k\right) \leq M.$$

Optionally, $U_1$ and $U_2$ are integers meeting $$\log_2\left(1 + \sum_{k=U_1}^{U_2} C_N^k\right) \leq M.$$

Optionally, the elements h in H are positive integers meeting $$\log_2\left(1 + \sum_{h \in H} C_N^h\right) \leq M.$$

Optionally, U is a minimum integer meeting $$\log_2\left(1 + \sum_{k=U}^{N} C_N^k\right) \leq M,$$

or, U=aN, where $$\frac{1}{N} < a < 1.$$

Optionally, $U_1$ and $U_2$ are integers meeting $$\log_2\left(1 + \sum_{k=U_1}^{U_2} C_N^k\right) \leq M$$

and making $U_2 - U_1$ maximum, or, $U_1 = bN$ and $U_2 = cN$, where $$\frac{1}{N} \leq b \leq c < 1.$$

Optionally, the judgment unit 342 is configured to, when the preset value range is the integers more than or equal to the threshold U and less than or equal to N, judge whether $U \leq k \leq N$ is true. The generation unit 344 is configured to, when the judgment unit 342 judges that $U \leq k \leq N$ is true, determine the first HARQ state value from $$\sum_{k=U}^{N} C_N^k$$

values, where each value in the $$\sum_{k=U}^{N} C_N^k$$

values of the first HARQ state value corresponds to a receiving condition of the N transmission blocks when $U \leq k \leq N$ one to one, and generate the determined first HARQ state value.

Optionally, the device further includes: the second generation module 52 and the second sending module 54. The second generation module 52 is configured to, when the judgment unit 342 judges that $0 \leq k < U$ is true, determine the second HARQ state value from S values, where at least one value in the S values of the second HARQ state value is adopted to represent at least two receiving conditions of the N transmission blocks when $0 \leq k < U$, S is an integer, $$0 < S \leq \left(2^M - \sum_{k=U}^{N} C_N^k\right)$$

and $\log_2(S) \leq W$, and generate the determined second HARQ state value. The second sending module 54 is configured to send the second HARQ state value as the HARQ information.

Optionally, the judgment unit 342 is configured to, when the preset value range is the integers more than or equal to the threshold $U_1$ and less than or equal to $U_2$, judge whether $U_1 \le k \le U_2$ is true. The generation unit 344 is configured to, when the judgment unit 342 judges that $U_1 \le k \le U_2$ is true, determine the first HARQ state value from $$\sum_{k=U_1}^{U_2} C_N^k$$

values, where each value in the $$\sum_{k=U_1}^{U_2} C_N^k$$

values of the first HARQ state value corresponds to a receiving condition of the N transmission blocks when $U_1 \le k \le U_2$ one to one, and generate the determined first HARQ state value.

Optionally, the device further includes: the second generation module 52 and the second sending module 5. The second generation module 52 is configured to, when the judgment unit 342 judges that $0 \le k < U_1$ or $U_2 < k \le N$ is true, determine the second HARQ state value from T values, where at least one value in the T values of the second HARQ state value is adopted to represent at least two receiving conditions of the N transmission blocks when $0 \le k < U_1$ or $U_2 < k \le N$, T is an integer, $$0 < T \le \left( 2^M - \sum_{k=U_1}^{U_2} C_N^k \right)$$

and $\log_2(T) \le W$, and generate the determined second HARQ state value. The second sending module 54 is configured to send the second HARQ state value as the HARQ information.

Optionally, the judgment unit 342 is configured to, when the preset value range is the threshold set H, judge whether $k \in H$ is true. The generation unit 344 is configured to, when the judgment unit 342 judges that $k \in H$ is true, determine the first HARQ state value from $$\sum_{h \in H} C_N^h$$

values, where each value in the $$\sum_{h \in H} C_N^h$$

values of the first HARQ state value corresponds to a receiving condition of the N transmission blocks when $k \in H$ one to one, and generate the determined first HARQ state value.

Optionally, the device further includes: the second generation module 52 and the second sending module 54. The second generation module 52 is configured to, when the judgment unit 342 judges that $k \notin H$ is true, determine the second HARQ state value from R values, where at least one value in the R values of the second HARQ state value is adopted to represent at least two receiving conditions of the N transmission blocks when $k \in H$, R is an integer, $$0 < R \le \left( 2^M - \sum_{h \in H} C_N^h \right)$$

and $\log_2(R) \le W$, and generate the determined second HARQ state value. The second sending module 54 is configured to send the second HARQ state value as the HARQ information.

Optionally, the N transmission blocks are positioned on multiple carriers respectively.

An embodiment further provides a HARQ receiving device, which is arranged to implement the HARQ receiving method, and what has been described will not be elaborated. Modules involved in the device will be described below.

Figure 6:
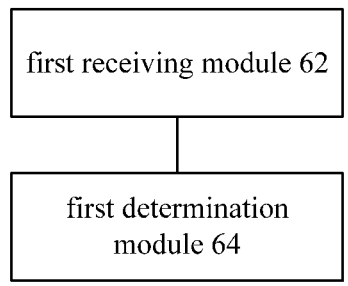
FIG. 6 is a structure diagram of a HARQ receiving device according to an embodiment of the disclosure.

FIG. 6 is a structure diagram of a HARQ receiving device according to an embodiment of the disclosure. As shown in FIG. 6, the device includes a first receiving module 62 and a first determination module 64. The first receiving module 62 is configured to receive a first HARQ state value with a length of M bits, where the first HARQ state value has a plurality of optional values, each corresponding to a respective receiving condition of N transmission blocks when k falls within a preset value range, k is a number of transmission blocks which are correctly received in the received transmission blocks, M, N and k are integers, $2 \le M < N$, and $0 \le k \le N$. The first determination module 64 is coupled to the first receiving module 62 and configured to determine a receiving condition of a receiver for the N transmission blocks according to the first HARQ state value.

Figure 7:
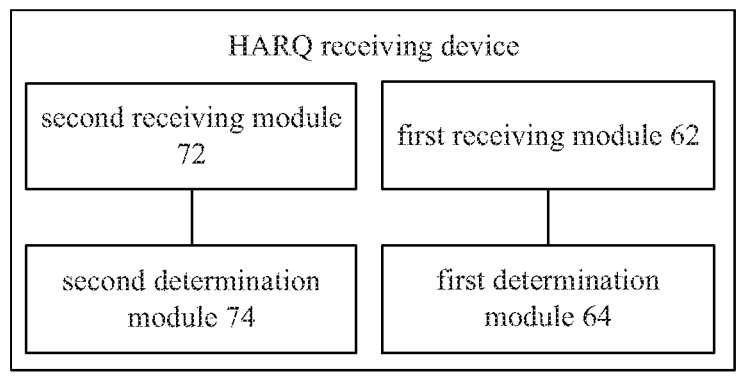
FIG. 7 is an optional structure diagram of a HARQ receiving device according to an embodiment of the disclosure.

FIG. 7 is an optional structure diagram of a HARQ receiving device according to an embodiment of the disclosure. As shown in FIG. 7, optionally, the device further includes a second receiving module 72 and a second determination module 74. The second receiving module 72 is configured to receive a second HARQ state value with a length of W bits, where at least one value in all values of the second HARQ state value is adopted to represent at least two receiving conditions of the N transmission blocks when k does not fall within the preset value range, and $2 \le W \le M$. The second determination module 74 is coupled to the second receiving module 72 and configured to determine the receiving condition of the receiver for the N transmission blocks according to the second HARQ state value.

An embodiment of the disclosure further provides a node, which includes: the abovementioned HARQ sending device, and/or, the abovementioned HARQ receiving method.

Optionally, the node may be a user terminal or a base station respectively.

In addition, function units in the embodiment of the disclosure may be integrated into a processing unit, each unit may also independently and physically exist, and two or more than two units may further be integrated into a unit. The integrated unit may be implemented in form of hardware, and may also be implemented in form of software function unit.

For describing the embodiments of the disclosure more clearly, descriptions and explanations will be made below in combination with an application example.

The application example of the disclosure provides a HARQ information sending method and device, and its purpose is to reduce overhead for HARQ information and simultaneously meet a requirement of little influence on a throughput of a system so as to at least solve the problem of obvious reduction of the throughput of the system due to reduction of the overhead for feedback of a HARQ in the related technology.

In order to achieve the purpose, it is assumed that a node 1 and a node 2 make an agreement on adoption of M bits for feedback of HARQ information of N transmission blocks. Here, the N transmission blocks may be positioned on I carriers respectively, and the number of the transmission blocks on the carrier i (i=1, 2, . . . I) is $Q_i$. It is assumed that a number of transmission blocks which are detected by a terminal to be correct is k. Here, M may be a positive integer not smaller than 1, and N may be a positive integer not smaller than 2.

Optionally, 1<M<N; 1≤I; $Q_i$≤N; and 0≤k≤N.

Based on the hypothesis made above, the solution of the application example of the disclosure is described as follows.

Method 1

The node 1 determines a corresponding HARQ state according to a threshold U, where U is a positive integer, and meets $$\log_2\left(1 + \sum_{k=U}^{N} C_N^k\right) \le M.$$

The threshold U may be determined by an agreement made between the node 2 and the node 1. For example, the node 2 notifies, the node 1, of a value of U through signaling. Alternatively, the two parties make an agreement on that U is equal to a value related to N, for example, U=0.7N. Optionally, U is a minimum positive integer meeting $$\log_2\left(1 + \sum_{k=U}^{N} C_N^k\right) \le M.$$

When k≥U, each receiving condition corresponds to a HARQ state one to one (each state is represented with M bits, and there are totally $$\sum_{k=U}^{N} C_N^k$$

conditions); and when k<U, totally $$\sum_{k=0}^{U-1} C_N^k$$

conditions are represented with one or more in left $$\left(2^M - \sum_{k=U}^{N} C_N^k\right)$$

states, different conditions may correspond to the same or different HARQ states, but at least two conditions correspond to the same HARQ state.

The node 1 feeds back the selected HARQ state to the node 2 according to a detected correct or incorrect condition (i.e. a receiving condition) of the transmission blocks.

Method 2

The node 1 determines a corresponding HARQ state according to two thresholds $U_1$ and $U_2$, where $U_1$ and $U_2$ (1≤$U_1$≤$U_2$<N) are positive integers, and meet $$\log_2\left(1 + \sum_{k=U_1}^{U_2} C_N^k\right) \le M.$$

The thresholds $U_1$ and $U_2$ may be determined by an agreement made between the node 2 and the node 1. For example, the node 2 determines values of $U_1$ and $U_2$ according to channel state information, a scheduling strategy and the like, and notifies, the node 1, of the values of $U_1$ and $U_2$ through signaling. Alternatively, the two parties make an agreement on that $U_1$ and $U_2$ are equal to a value related to N. For example, it may be specified that $U_1$ and $U_2$ are corresponding values meeting $$\log_2\left(1 + \sum_{k=U_1}^{U_2} C_N^k\right) \le M$$

and making $U_2-U_1$ maximum.

When $U_1$≤k≤$U_2$, each condition corresponds to a HARQ state one to one (each state is represented with M bits, and there are totally $$\sum_{k=U_1}^{U_2} C_N^k$$

conditions). For other conditions, totally $$\left(2^N - \sum_{k=U_1}^{U_2} C_N^k\right)$$

conditions are represented with one or more in left $$\left(2^M - \sum_{k=U_1}^{U_2} C_N^k\right)$$

states, different conditions may correspond to the same or different HARQ states, but at least two conditions correspond to the same HARQ state.

The node 1 feeds back the selected HARQ state to the node 2 according to a detected correct or incorrect condition of the transmission blocks.

Method 3

The node 1 determines a corresponding HARQ state according to a set H of two thresholds, wherein each element h in H is a positive integer, 1≤h<N and $$\log_2\left(1 + \sum_{h \in H} C_N^h\right) \le M$$

is met.

The threshold set H and each element therein may be determined by an agreement made between the node 2 and the node 1. For example, the node 2 determines a value of H according to the channel state information, the scheduling strategy and the like, and notifies, the node 1, of the value of H through signaling.

When k is equal to a certain element in the threshold set H, each condition corresponds to a HARQ state one to one (each state is represented with M bits, and there are totally $$\sum_{h \in H} C_N^h$$

conditions). For other conditions, totally $$\left(2^N - \sum_{h \in H} C_N^h\right)$$

conditions are represented with one or more in left $$\left(2^M - \sum_{h \in H} C_N^h\right)$$

states, different conditions may correspond to the same or different HARQ states, but at least two conditions correspond to the same HARQ state.

The node 1 feeds back the selected HARQ state to the node 2 according to a detected correct or incorrect condition of the transmission blocks.

By one of the abovementioned solutions, the overhead for feedback of the HARQ information may be reduced, and multiple advantages of little influence on the throughput of the system, simplicity for implementation and the like are also achieved.

The abovementioned application example will be described below in combination with the drawings and principles.

Application Example 1

A terminal (a node 1) and a base station (a node 2) make an agreement on adoption of M bits for feedback of HARQ information of N transmission blocks. Here, the N transmission blocks may be positioned on I carriers respectively, the number of the transmission blocks on the carrier i (i=1, 2, ... I) is $Q_i$, and $$N = \sum_{i=1}^{I} Q_i.$$

It is assumed that a number of transmission blocks which are detected by the terminal to be correct is k. Here, M is a positive integer not smaller than 2, N is a positive integer not smaller than 3, and the following conditions are met:

1<$M$<$N$; 1≤$I$, and $Q_i$≤$N$; and 0≤$k$≤$N$.

For the k transmission blocks which are detected to be correct, there are totally $C_N^k$ conditions according to indexes corresponding to these transmission blocks in the N transmission blocks, and considering 0≤k≤N, there are totally $$\sum_{k=1}^{N} C_N^k$$

conditions.

In the application example of the disclosure, the node 1 determines a corresponding HARQ state according to a threshold U, where U is a positive integer, and meets $$\log_2\left(1 + \sum_{k=U}^{N} C_N^k\right) \le M.$$

The threshold U may be determined by an agreement made between the node 2 and the node 1. For example, the node 2 notifies, the node 1, of a value of U through signaling, or the two parties make an agreement on that U is equal to a value related to N, for example, U=0.7N. Optionally, U is a minimum positive integer meeting $$\log_2\left(1 + \sum_{k=U}^{N} C_N^k\right) \le M.$$

When k≥U, each condition corresponds to a HARQ state one to one (each state is represented with M bits, and there are totally $$\sum_{k=U}^{N} C_N^k$$

conditions). There are multiple manners for one-to-one correspondence between each condition and the HARQ state. For example: the $$\sum_{k=U}^{N} C_N^k$$

conditions may be numbered, indexes thereof are set to be $$0, 1, \ldots \sum_{k=U}^{N} C_N^k - 1$$

respectively, the M bits may represent $2^M$ HARQ states, indexes thereof are set to be 0, 1, ..., r, ..., $2^M$−1, and then the condition with the index r may correspond to the HARQ state with the index r, or the condition with the index r corresponds to the HARQ state with the index (r+C)MOD ($2^M$), etc. (C is a constant), MOD representing remainder calculation.

When k<U, totally $$\sum_{k=0}^{U-1} C_N^k$$

conditions are represented with one or more in left $$\left(2^M - \sum_{k=U}^{N} C_N^k\right)$$

states, different conditions may correspond to the same or different HARQ states, but at least two conditions correspond to the same HARQ state.

When $$\left(2^M - \sum_{k=U}^{N} C_N^k\right)$$

is equal to 1, all of the $$\sum_{k=0}^{U-1} C_N^k$$

conditions correspond to the same HARQ state. When $$\left(2^M - \sum_{k=U}^{N} C_N^k\right)$$

is larger than 1, at least two conditions correspond to the same HARQ state.

Optionally, it is assumed that the totally $$\sum_{k=0}^{U-1} C_N^k$$

conditions are represented with S in the left $$\left(2^M - \sum_{k=U}^{N} C_N^k\right)$$

states. When $\lceil \log_2(S) \rceil < M$ ($\lceil \ \rceil$ represents rounding up), the node 1 may further represent the HARQ state with W bits, besides representing the HARQ state with the M bits, W being an integer smaller than M and meeting $\log_2(S) \leq W$.

Furthermore, the node 1 selects different channel formats for sending HARQ information according to whether k≥U is true. When k≥U is true, The size of information bearable for a channel format selected by the node 1 to send the HARQ information is at least M bits. When k≥U is false, The size of information bearable for a channel format selected by the node 1 to send the HARQ information is not smaller than $\lceil \log_2(S) \rceil$.

For example, it is assumed that M=10 and S=2. When k≥U, the node 1 may select a Physical Uplink Control Channel (PUCCH) format 3 (an information amount bearable for it is 21 bits) of an LTE system. When k<U, the node 1 may select a PUCCH format 1a (an information amount bearable for it is 1 bit) of the LTE system. Different formats require different signal-to-noise ratios when achieving the same target bit error rate, and a signal-to-noise ratio required by the PUCCH format 1a is far lower than the PUCCH format 3. Such a manner may achieve an effect of reducing feedback overhead, and further has an effect of reducing power consumption of the node 1 when k<U is true.

After the abovementioned processing, the node 1 feeds back the selected HARQ state to the node 2 according to a detected correct or incorrect condition of the transmission blocks.

Application Example 2

Based on the abovementioned method 1, it is assumed that N=32 and M=21. Normally, a base station may determine a coding transmission resource and corresponding coding and modulation scheme for a certain transmission block according to a channel state between the base station and a terminal and a probability p that the transmission block is detected to be correct, a typical value of p being 0.9. It is set that a probability that each transmission block is detected to be correct is independent, and then a probability Y(k) that k transmission blocks are detected by the terminal to be correct is:

$$Y(k)=C_n^k p^k (1-p)^{(N-k)}.$$

Figure 8:
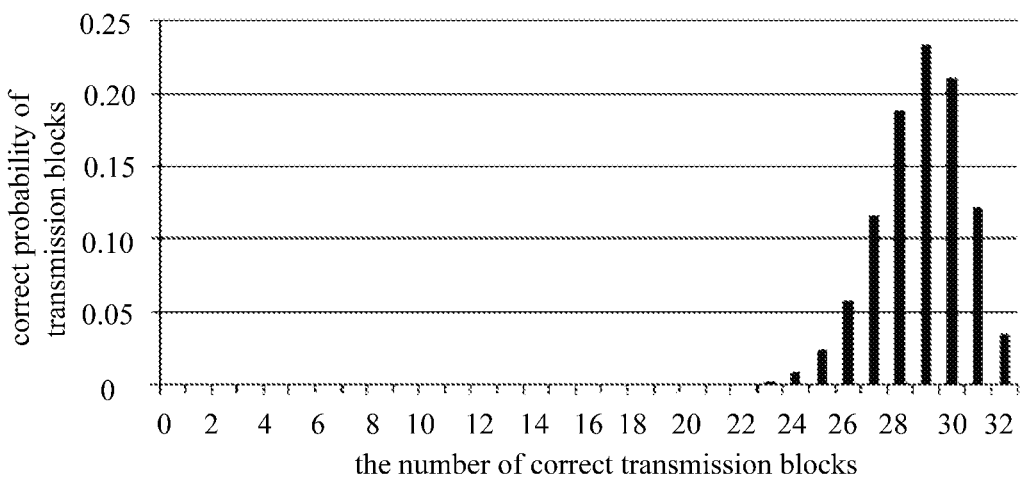
FIG. 8 is a schematic diagram of a probability distribution of Y(k) when N=32 and p=0.9 according to an application example of the disclosure.

FIG. 8 shows a schematic diagram of a probability distribution of Y(k) when N=32 and p=0.9. From FIG. 8, it can be seen that a probability distribution of numbers of transmission blocks which are detected by the terminal to be correct is non-uniform, and instead, they are highly probably distributed on few numerical values in a concentrated manner. For example, as shown in FIG. 8, the numbers of the transmission blocks which are detected to be correct are distributed between 25~32 in the concentrated manner, and probabilities that the numbers of the transmission blocks which are detected to be correct are distributed between 0~20 may almost be ignored. In the application example, the base station and the terminal make an agreement on that a threshold U=26. It is assumed that a number of transmission blocks which are detected by the terminal to be correct is k. For example, when k=32, that is, it is detected that 32 transmission blocks are all correct, such a condition corresponds to 32 ACKs, and in the application example, the condition may be represented with M bits (here, M=21). For example, for convenient description, a HARQ state value "0" is selected to represent the state in the application example, i.e. a value "0" represented by an M-bit binary number.

When k=31, that is, it is detected that one of the 32 transmission blocks is detected to be incorrect, there are totally 32 conditions. Because k≥U, based on the application example of the disclosure, the 32 conditions should be represented with different numerical values (equivalent to the abovementioned HARQ state value), and are not overlapped with HARQ state values when k is equal to other values. For example, the 32 conditions are caused to correspond to HARQ state values of which numerical values are 1~32 respectively. Other conditions when k≥U (U=26) may be represented in the same manner. There are totally $$\sum_{k=26}^{32} C_{32}^k = 1{,}149{,}017$$

conditions when k≥U, and 21 bits may represent 2,097,152 conditions, so that the 1,149,017 conditions may be represented with the 21 bits without overlapping (for example, corresponding to numerical values 0, 1, . . . , 1,149,016 respectively). Besides representing the 1,149,017 conditions, the 21 bits may further additionally represent at most 948,315 (i.e. 2,097,152–1,149,017) conditions. When k<U, based on the application example of the disclosure, there are multiple possible implementation forms as long as at least two conditions correspond to the same HARQ state value. For example, all conditions are caused to correspond to the same HARQ state value, and for example, are represented with a HARQ state value with a numerical value of 1,149,018. For example, when 0≤k≤2, each condition corresponds to different HARQ state values, and for example, corresponds to 1,149,018~4,149,546 respectively (of course, these numerical values should also be different from the HARQ state values when k≥U). When 3≤k≤25, each condition corresponds to the same HARQ state value, and for example, corresponds to the HARQ state value with the numerical value of 1,149,546.

Compared with a conventional HARQ information sending method, the solution provided by the application example of the disclosure may reduce overhead for feedback of HARQ information on one hand. For example, in the abovementioned embodiment, the feedback overhead may be reduced by over 30%. On the other hand, the feedback overhead reduction method has very little negative influence on a throughput of a system, and this is because adopting the method provided by the application example of the disclosure avoids HARQ information distortion caused by compression of a HARQ receiving condition with a high probability of occurrence. Still with the application example as an example, a HARQ state with an over-96% probability of occurrence is not compressed, and only a HARQ state with a below-4% probability of occurrence is compressed.

Application Example 3

Based on the abovementioned method 2, a terminal (a node 1) and a base station (a node 2) make an agreement on adoption of M bits for feedback of HARQ information of N transmission blocks. In the application example, the node 1 determines a corresponding HARQ state according to two thresholds $U_1$ and $U_2$ wherein $U_1$ and $U_2$ ($1 \leq U_1 \leq U_2 < N$) are positive integers, and meet $$\log_2\left(1 + \sum_{k=U_1}^{U_2} C_N^k\right) \leq M.$$

The thresholds $U_1$ and $U_2$ may be determined by an agreement made between the node 2 and the node 1. For example, the node 2 determines values of $U_1$ and $U_2$ according to channel state information, a scheduling strategy and the like, and notifies, the node 1, of the values of $U_1$ and $U_2$ through signaling. Alternatively, the two parties make an agreement on that $U_1$ and $U_2$ are equal to a value related to N. For example, it is specified that $U_1$ and $U_2$ are corresponding values meeting $$\log_2\left(1 + \sum_{k=U_1}^{U_2} C_N^k\right) \leq M$$

and making $U_2 - U_1$ maximum.

When $U_1 \leq k \leq U_2$, each condition corresponds to a HARQ state one to one (each state is represented with M bits, and there are totally $$\sum_{k=U_1}^{U_2} C_N^k$$

conditions). For other conditions, totally $$\left(2^N - \sum_{k=U_1}^{U_2} C_N^k\right)$$

conditions are represented with one or more in left $$\left(2^M - \sum_{k=U_1}^{U_2} C_N^k\right)$$

states, different conditions may correspond to the same or different HARQ states, but at least two conditions correspond to the same HARQ state.

The node 1 feeds back the selected HARQ state to the node 2 according to a detected correct or incorrect condition of the transmission blocks.

The method is applied to the case that the number of transmission blocks which are practically detected by the node 1 is smaller than N. For example, for reasons of the scheduling strategy and the like, the number of transmission blocks which are practically sent to the node 1 by the node 2 is smaller than N. Making the agreement on $U_1$ and $U_2$ may represent a HARQ state with a relatively high practical sending probability with limited bits, thereby reducing influence of HARQ information compression on a throughput of a system as much as possible.

On the other hand, reasonably setting and making the agreement on $U_1$ and $U_2$ may further effectively reduce feedback overhead. It is assumed that a probability that a transmission block is detected to be correct is p and a probability that each transmission block is detected to be correct is independent, and as mentioned above, a probability $Y(k)$ that k transmission blocks are detected by the terminal to be correct is:

$$Y(k) = C_n^k p^k (1-p)^{(N-k)}.$$

It can be found that: when k is an integer belonging to [Np+p−1,Np+p], Y(k) is maximum, so that it is assumed that:

$$U_1 = \min(Np+p-1, Np+p)$$

$$U_2 = \max(Np+p-1, Np+p),$$

Then, feedback of the HARQ information may be implemented with $$M = \left\lceil \log_2\left(1 + \sum_{k=U_1}^{U_2} C_N^k\right) \right\rceil$$

bits. Meanwhile, when the method is adopted for HARQ information feedback, a HARQ state with a highest probability of occurrence is not compressed, so that this feedback manner also greatly reduces the influence of HARQ information compression on the throughput of the system.

Application Example 4

Figure 9:
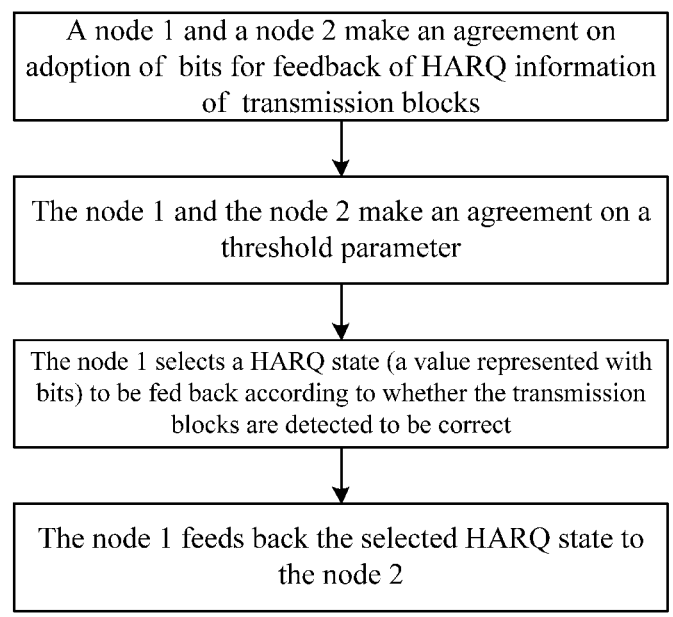
FIG. 9 is a flowchart of a HARQ transmission method according to an application example of the disclosure.

FIG. 9 is a flowchart of implementing an application example of the disclosure. As shown in FIG. 9, the flow includes the following steps.

In Step 1, a node 1 and a node 2 make an agreement on adoption of M bits for feedback of HARQ information of N transmission blocks.

In Step 2, the node 1 and the node 2 make an agreement on a threshold parameter.

In Step 3, the node 1 selects a HARQ state (a value represented with the M bits) to be fed back according to whether the transmission blocks are detected to be correct.

In Step 4, the node 1 feeds back the selected HARQ state to the node 2.

Application Example 5

A node 1 determines a corresponding HARQ state according to a set H of two thresholds, where each element h in H is a positive integer (1≤h<N) and meets $$\log_2\left(1 + \sum_{h \in H} C_N^h\right) \leq M.$$

The threshold set H and each element therein may be determined by an agreement made between a node 2 and the node 1. For example, the node 2 determines a value of H according to channel state information, a scheduling strategy and the like, and notifies, the node 1, of the value of H through signaling.

When k is equal to a certain element in the threshold set H, each condition corresponds to a HARQ state one to one (each state is represented with M bits, and there are totally $$\sum_{h \in H} C_N^h$$

conditions). For other conditions, totally $$\left(2^N - \sum_{h \in H} C_N^h\right)$$

conditions are represented with one or more in left $$\left(2^M - \sum_{h \in H} C_N^h\right)$$

states, different conditions may correspond to the same or different HARQ states, but at least two conditions correspond to the same HARQ state.

In another embodiment, software is further provided, which is configured to execute the technical solutions described in the abovementioned embodiments and optional implementation modes.

In another embodiment, a storage medium is further provided, in which the abovementioned software is stored, the storage medium including, but not limited to: an optical disk, a floppy disk, a hard disk, an erasable memory and the like.

It is important to note that terms "first", "second" and the like in the specification, claims and drawings of the disclosure are adopted not to describe a specific sequence or order but to distinguish similar objects. It should be understood that objects used like this may be exchanged under a proper condition for implementation of the embodiments, described here, of the disclosure in a sequence besides those shown or described here. In addition, terms "include" and "have" and any transformation thereof are intended to cover nonexclusive inclusions. For example, a process, method, system, product or equipment including a series of steps or units is not limited to those steps or units which are clearly listed, but may include other steps or units which are not clearly listed or intrinsic to the process, the method, the product or the equipment.

Obviously, those skilled in the art should know that the modules or steps of the disclosure may be implemented by a universal computing device, and the modules or steps may be concentrated on a single computing device or distributed on a network formed by a plurality of computing devices, and may optionally be implemented by program codes executable for the computing devices, so that the modules or steps may be stored in a storage device for execution with the computing devices, the shown or described steps may be executed in sequences different from those described here in some circumstances, or may form each integrated circuit module respectively, or multiple modules or steps therein may form a single integrated circuit module for implementation. As a consequence, the disclosure is not limited to any specific hardware and software combination.

The above is only the embodiment of the disclosure and not intended to limit the disclosure. For those skilled in the art, the disclosure may have various modifications and variations. Any modifications, equivalent replacements, improvements and the like made within the spirit and principle of the disclosure shall fall within the scope of protection of the disclosure.

INDUSTRIAL APPLICABILITY

According to the embodiments of the disclosure, the receiving condition of the transmission blocks when the number of the transmission blocks which are correctly received in the N transmission blocks falls within the preset value range is represented by the first HARQ state value which includes values fewer than N bits and has the length of M bits, so that the bit length of the HARQ information is reduced to be M, the problem of high occupied overhead for feedback of the HARQ information is solved, and the overhead for feedback of the HARQ information is reduced.

The invention claimed is:

1. A Hybrid Automatic Repeat Request, HARQ, sending method, comprising:
   detecting a receiving condition of N transmission blocks;
   judging whether k falls within a preset value range, wherein k is a number of transmission blocks which are correctly received in received transmission blocks;
   when it is judged that k falls within the preset value range, generating a first HARQ state value with a length of M bits according to the receiving condition, and sending the first HARQ state value as HARQ information, wherein the length of M bits is smaller than the number N of the transmission blocks, the first HARQ state value has a plurality of optional values, each corresponding to a respective receiving condition of the N transmission blocks when k falls within the preset value range, M, N and k are integers, $2 \leq M < N$, and $0 \leq k \leq N$; and
   when it is judged that k does not fall within the preset value range, generating a second HARQ state value with a length of W bits according to the receiving condition, and sending the second HARQ state value as the HARQ information, wherein at least one value in all values of the second HARQ state value is adopted to represent at least two receiving conditions of the N transmission blocks when k does not fall within the preset value range, and $2 \leq W \leq M$.

2. The method according to claim 1, wherein
   the first HARQ state value and the second HARQ state value are sent as the HARQ information in a same channel format; or
   the first HARQ state value and the second HARQ state value are sent as the HARQ information in different channel formats.

3. The method according to claim 1, wherein
   the preset value range, a corresponding relationship between all the values of the first HARQ state value and the receiving conditions of the N transmission blocks and a corresponding relationship between all the values of the second HARQ state value and the receiving conditions of the N transmission blocks are preconfigured at a sender of the transmission blocks and a receiver of the transmission blocks; or
   the preset value range, the corresponding relationship between all the values of the first HARQ state value and the receiving conditions of the N transmission blocks and the corresponding relationship between all the values of the second HARQ state value and the receiving conditions of the N transmission blocks are determined by negotiation between the sender and the receiver.

4. The method according to claim 1, wherein the preset value range comprises:
   integers more than or equal to a threshold U and less than or equal to N, wherein $1 \leq U \leq N$; or
   integers more than or equal to a threshold $U_1$ and less than or equal to $U_2$, wherein $1 \leq U_1 \leq U_2 \leq N$; or
   a threshold set H, wherein each element h in H meets $1 \leq h < N$.

5. The method according to claim 4, wherein
   U is an integer meeting $$\log_2\left(1 + \sum_{k=U}^{N} C_N^k\right) \leq M;$$

$U_1$ and $U_2$ are integers meeting $$\log_2\left(1 + \sum_{k=U_1}^{U_2} C_N^k\right) \leq M;$$

and
   the elements h in H are positive integers meeting $$\log_2\left(1 + \sum_{k=U}^{N} C_N^k\right) \leq M,$$

$C_N^k$ represents a number of combined forms in k selected from N elements,
   $C_N^h$ represents a number of combined forms in h selected from N elements.

6. The method according to claim 5, wherein
   U is a minimum integer meeting $$\log_2\left(1 + \sum_{k=U}^{N} C_N^k\right) \leq M,$$

or,
   U=aN, where $$\frac{1}{N} \leq a < 1;$$

and
   $U_1$ and $U_2$ are integers meeting $$\log_2\left(1 + \sum_{k=U_1}^{U_2} C_N^k\right) \leq M$$

and making $U_2 - U_1$ maximum, or,
   $U_1$=bN and $U_2$=cN, where $$\frac{1}{N} \leq b \leq c < 1.$$

7. The method according to claim 4, wherein, when the preset value range is the integers more than or equal to the threshold U and less than or equal to N, generating the first HARQ state value with the length of M bits according to the receiving condition comprises:
   judging whether $U \leq k \leq N$ k is true;
   when it is judged that $U \leq k \leq N$ is true, determining the first HARQ state value from $$\sum_{k=U}^{N} C_N^k$$

values, wherein each value in the $$\sum_{k=U}^{N} C_N^k$$

values of the first HARQ state value corresponds to a receiving condition of the N transmission blocks when U≤k≤N one to one, and $C_N^k$ represents a number of combined forms in k selected from N elements; and generating the determined first HARQ state value.

8. The method according to claim 7, further comprising:
when it is judged that 0≤k<U is true, determining the second HARQ state value from S values, wherein at least one value in the S values of the second HARQ state value is adopted to represent at least two receiving conditions of the N transmission blocks when 0≤k<U, wherein S is an integer, $$0 < S \le \left(2^M - \sum_{k=U}^{N} C_N^k\right)$$

and $\log_2(S) \le W$;

generating the determined second HARQ state value; and
sending the second HARQ state value as the HARQ information.

9. The method according to claim 4, wherein, when the preset value range is the integers more than or equal to the threshold $U_1$ and less than or equal to $U_2$ generating the first HARQ state value with the length of M bits according to the receiving condition comprises:

judging whether $U_1 \le k \le U_2$ is true;
when it is judged that $U_1 \le k \le U_2$ is true, determining the first HARQ state value from $$\sum_{k=U_1}^{U_2} C_N^k$$

values, wherein each value in the $$\sum_{k=U_1}^{U_2} C_N^k$$

values of the first HARQ state value corresponds to a receiving condition of the N transmission blocks when $U_1 \le k \le U_2$ one to one, and $C_N^k$ represents a number of combined forms in k selected from N elements; and generating the determined first HARQ state value.

10. The method according to claim 9, further comprising:
when it is judged that 0≤k<$U_1$ or $U_2$<k≤N, determining the second HARQ state value from T values, wherein at least one value in the T values of the second HARQ state value is adopted to represent at least two receiving conditions of the N transmission blocks when 0≤k<$U_1$ or $U_2$<k≤N, wherein T is an integer, $$0 < T \le \left(2^M - \sum_{k=U_1}^{U_2} C_N^k\right)$$

and $\log_2(T) \le W$;

generating the determined second HARQ state value; and
sending the second HARQ state value as the HARQ information.

11. The method according to claim 4, wherein, when the preset value range is the threshold set H, generating the first HARQ state value with the length of M bits according to the receiving condition comprises:

judging whether k∈H is true;
when it is judged that k∈H is true, determining the first HARQ state value from $$\sum_{h \in H} C_N^h$$

values, wherein each value in the $$\sum_{h \in H} C_N^h$$

values of the first HARQ state value corresponds to a receiving condition of the N transmission blocks when k∈H one to one, and $C_N^h$ represents a number of combined forms in h selected from N elements; and generating the determined first HARQ state value.

12. The method according to claim 11, further comprising:
when it is judged that k∉, determining the second HARQ state value from R values, wherein at least one value in the R values of the second HARQ state value is adopted to represent at least two receiving conditions of the N transmission blocks when k∉H, wherein R is an integer, $$0 < R \le \left(2^M - \sum_{h \in H} C_N^h\right)$$

and $\log_2(R) \le W$;

generating the determined second HARQ state value; and
sending the second HARQ state value as the HARQ information.

13. The method according to claim 1, wherein the N transmission blocks are positioned on a plurality of carriers respectively.

14. A Hybrid Automatic Repeat Request, HARQ, receiving method, comprising:
receiving a first HARQ state value with a length of M bits, wherein the first HARQ state value has a plurality of optional values, each corresponding to a respective receiving condition of N transmission blocks when k falls within a preset value range, the length of M bits is smaller than the number N of the transmission blocks, k is a number of transmission blocks which are correctly received in the received transmission blocks, M, N and k are integers, 2≤M<N, and 0≤k≤N; and determining a receiving condition of a receiver for the N transmission blocks according to the first HARQ state value, wherein the method further comprising:

receiving a second HARQ state value with a length of W bits, wherein at least one value in all values of the second HARQ state value is adopted to represent at least two receiving conditions of the N transmission blocks when k does not fall within the preset value range, wherein 2≤W≤M; and determining the receiving condition of the receiver for the N transmission blocks according to the second HARQ state value.

15. A Hybrid Automatic Repeat Request, HARQ, sending device, comprising a processor and a memory for storing a set of instructions executable for the processor, wherein the instructions are executed by the processor, the processor is configured to:

detect a receiving condition of N transmission blocks;

judge whether k falls within the preset value range, wherein k is a number of transmission blocks which are correctly received in received transmission blocks;

when it is judged that k falls within the preset value range, generate a first HARQ state value with a length of M bits according to the receiving condition, and send the first HARQ state value as HARQ information, wherein the length of M bits is smaller than the number N of the transmission blocks, the first HARQ state value has a plurality of optional values, each corresponding to a respective receiving condition of the N transmission blocks when k falls within the preset value range, k is a number of transmission blocks which are correctly received in the received transmission blocks, wherein M, N and k are integers, 2≤M<N, and 0≤k≤N; and when it is judged that k does not fall within the preset value range, generate a second HARQ state value with a length of W bits according to the receiving condition, and send the second HARQ state value as the HARQ information, wherein at least one value in all values of the second HARQ state value is adopted to represent at least two receiving conditions of the N transmission blocks when k does not fall within the preset value range, and 2≤W≤M.

* * * * *